(12) United States Patent
Yamada et al.

(10) Patent No.: US 6,335,808 B1
(45) Date of Patent: Jan. 1, 2002

(54) IMAGE READING APPARATUS

(75) Inventors: Haruyoshi Yamada, Nagano; Yasushi Hoshino, Tokyo; Kohichi Yamaguchi, Tokyo; Toshiki Fujisawa, Tokyo; Satoshi Harada, Tokyo; Kousei Miyauchi, Tokyo, all of (JP)

(73) Assignees: Seiko Epson Corporation; Konica Corporation, both of Tokyo (JP)

( * ) Notice: Subject to any disclaimer, the term of this patent is extended or adjusted under 35 U.S.C. 154(b) by 0 days.

(21) Appl. No.: 08/973,148

(22) PCT Filed: Mar. 27, 1997

(86) PCT No.: PCT/JP97/01068

§ 371 Date: Nov. 28, 1997

§ 102(e) Date: Nov. 28, 1997

(87) PCT Pub. No.: WO97/36418

PCT Pub. Date: Oct. 2, 1997

(30) Foreign Application Priority Data

Mar. 28, 1996 (JP) .............................................. 8-73738

(51) Int. Cl.[7] .................................................. H04N 1/04
(52) U.S. Cl. ........................ 358/487; 358/474; 358/506
(58) Field of Search ................................. 358/487, 496, 358/494, 506, 498

(56) References Cited

U.S. PATENT DOCUMENTS

| | | | | |
|---|---|---|---|---|
| 4,752,212 A | * | 6/1988 | Ueda | 353/26 R |
| 4,786,980 A | * | 11/1988 | Sonohe | 358/335 |
| 5,424,555 A | * | 6/1995 | Kimura | 250/559 |
| 5,461,492 A | * | 10/1995 | Jones | 358/487 |
| 5,745,262 A | * | 4/1998 | Tatsumi | 358/487 |
| 5,872,643 A | * | 2/1999 | Maeda et al. | 358/487 |
| 5,926,289 A | * | 7/1999 | Brandestini et al. | 358/487 |
| 5,933,222 A | * | 8/1999 | Hoshino | 355/75 |

FOREIGN PATENT DOCUMENTS

| | | | | |
|---|---|---|---|---|
| JP | 9-294188 | * | 11/1997 | H04N/1/10 |
| WO | WO96/25004 | * | 8/1996 | H04N/1/00 |

* cited by examiner

*Primary Examiner*—Jerome Grant, II
(74) *Attorney, Agent, or Firm*—Morgan, Lewis & Bockius LLP

(57) ABSTRACT

To provide an image reading apparatus which is capable of easily and quickly specifying a frame of a transparency original for which image reading is desired from the transparency original having a plurality of frames and of image reading with high accuracy at the time of final reading of a specified image. The image reading apparatus comprises: a carrier member holding a film-shaped transparency original which has a plurality of frames; an illuminating means illuminating the transparency original; and an image reading means reading image data of the transparency original illuminated by the illuminating means, in which when the image data is read in previewing, the carrier member is moved by a carrier moving means, and when final image reading of the image data is effected, the carrier member is moved by moving a carrier frame having the carrier moving means. The image data which has been read is outputted to an image display device connected to the image reading apparatus.

16 Claims, 9 Drawing Sheets

IMAGE READING APPARATUS

This application is a 371 of PCT JP97/01068 of Mar. 27, 1997.

TECHNICAL FIELD

The present invention relates to an image reading apparatus for reading image data of a transparency original such as a photographic film and a microfilm, and more particularly to an image reading apparatus which permits a so-called preview by collectively reading a film-shaped transparency original having a plurality of frames.

BACKGROUND ART

As an image reading apparatus of this type, one disclosed in Japanese Patent Application Laid-Open No. 6-311311 is known. This conventional image reading apparatus (hereafter referred to as the "first image reading apparatus") comprises a carrier member holding a film-shaped transparency original which has a plurality of frames, a magazine member holding the carrier member, an illuminating means illuminating the transparency original which is held by the carrier member, an image reading means reading image data of the transparency original illuminated by the illuminating means, and a viewing unit displaying an image on the basis of the image data which has been read by the image reading means.

In this first image reading apparatus, when a user guides the carrier member with the transparency original fitted therein to an original-reading position inside the magazine member, the image reading means, while moving, reads a one-frame portion of image data of the transparency original. Then, as the image data which has been read is outputted to the viewing unit, an image of the one-frame portion is displayed on the viewing unit, thereby permitting previewing.

On the other hand, an image reading apparatus (hereafter referred to as the "second image reading apparatus") cited in the column "Prior Art" in the aforementioned publication is also conventionally known. This second image reading apparatus has a screen on which an image of the transparency original is projected, and the image of the transparency original is optically projected onto the screen, thereby permitting previewing. In this second image reading apparatus, as the carrier member is manually fed in continuously, all the images on the transparency original fitted in the carrier member can be previewed.

However, the first conventional image reading apparatus has the following problem. Namely, it is a one-frame portion of the transparency original that can be previewed in the first image reading apparatus. For this reason, the user must specify a frame for which image reading or previewing is desired, by confirming one frame at a time by allowing light to be transmitted through the transparency original fitted in the carrier member prior to image reading or previewing. Meanwhile, in a case where the plurality of images fitted in the carrier member resemble each other, particularly in a case where similar images continue as in a continuously shot photographic film, with the method of confirming by allowing light to be transmitted the transparency original, it is very difficult to reliably select a desired image on the transparency original. Therefore, despite the fact that a preview function is provided for facilitating the specification of an image to be read, the user must guide each frame in the carrier member to the reading position and effect previewing in order to reliably specify the image for which reading is desired. Thus, the first image reading apparatus has a problem in that the user is compelled to carry out a very troublesome operation to specify an image subject to reading.

On the other hand, with the second conventional image reading apparatus, the user is able to continuously confirm all of the transparency original in the carrier member by manually guiding the carrier member to the reading position. However, this second image reading apparatus is not so arranged as to be able to read and store the image on the transparency original as image data, and is merely arranged to optically project the image onto the screen. Therefore, in a case where the transparency original subject to reading can be only specified after a number of reconfirmations have been made, the carrier member must be guided again to a predetermined reading position on each such occasion, so that there is still a problem in that the user is compelled to carry out a troublesome operation.

Further, the following common problem exists in the above-described first and second image reading apparatuses. Namely, although, in an image reading apparatus, it is generally necessary to make an insertion port large so as to facilitate the insertion of the carrier member into the magazine member, a slight clearance is produced between the carrier member and the magazine member as a result of making the insertion port large. For this reason, the accuracy of movement of the carrier member declines due to the clearance, with the result that there is a problem in that the accuracy of image reading also declines. Thus, the conventional image reading apparatuses have a problem in that they cannot simultaneously satisfy the two requirements that the carrier member can be inserted easily into the magazine member and that images can be read accurately.

DISCLOSURE OF THE INVENTION

The present invention has been devised to overcome the above-described problems, and its standpoint lies in providing an image reading apparatus which is capable of easily specifying a frame of the transparency original for which image reading is desired from the transparency original with a plurality of frames which is held in the carrier member. Another standpoint of the present invention is to provide an image reading apparatus which facilitates the insertion of the carrier member and has high image reading accuracy.

To attain these standpoints, in accordance with the present invention, there is provided an image reading apparatus which comprises a carrier member holding a film-shaped transparency original which has a plurality of frames, an illuminating means illuminating the transparency original, an image reading means reading image data of the transparency original illuminated by the illuminating means, and a carrier frame having a carrier moving means which moves the carrier member to allow the image reading means to read the image data, the image reading apparatus further comprises: a read controlling means providing control such that the image data of each frame of the transparency original is continuously read by the image reading means by driving the carrier moving means in accordance with an image batch read command, in which the image data which has been read is outputted to an image display device connected to the image reading apparatus. According to this image reading apparatus, when an image batch read command is outputted from such as an external device or an operation switch, the read controlling means provides control to cause the image reading means to continuously read the image data of each frame of the transparency original by driving the carrier moving means. Then, the image data which has been read by the image reading means is outputted to an image display device which is an external device connected to the image reading apparatus, or to an image display device incorporated in the image reading apparatus. As a result, the user is easily able to specify a frame for which image reading is desired among the plurality of frames of the transparency original held in the carrier member.

In addition, in accordance with the present invention, there is provided an image reading apparatus which comprises a carrier member holding a film-shaped transparency original which has a plurality of frames, an illuminating means illuminating the transparency original, an image reading means reading image data of the transparency original illuminated by the illuminating means, and a carrier frame having a carrier moving means which moves the carrier member to allow the image reading means to read the image data, the image reading apparatus further comprises: a read controlling means providing control such that the image data of a designated frame of the transparency original is read by the image reading means by driving the carrier moving means in accordance with an image read command, in which the image data which has been read is outputted to an image display device connected to the image reading apparatus. According to this image reading apparatus, when an image read command is outputted from such as an external device or an operation switch, the read controlling means provides control to cause the image reading means to continuously and automatically read the image data of a plurality of frames or one specific frame of the transparency original designated by the image read command by driving the carrier moving means. Then, the image data which has been read by the image reading means is outputted to an image display device which is an external device connected to the image reading apparatus, or to an image display device incorporated in the image reading apparatus. Accordingly, the user is easily able to specify a frame for which image reading is desired among the plurality of frames of the transparency original held in the carrier member.

In addition, as for the image reading apparatus of the present invention, in the image reading apparatus according to claim 1 or 2, the read controlling means drives the carrier moving means so as to cause the image data of a frame subjected to frame designation in accordance with a frame designation command for designating one of the plurality of frames. In accordance with this image reading apparatus, if a frame designation command is outputted such as when the user has operated an operation switch after having specified an image for which image reading is desired among the images which have been read by the image reading apparatus, the read controlling means drives the carrier moving means. Consequently, the image reading means reads the image data of the frame-designated frame. Thus, the user is capable of reading the image data by designating an arbitrary frame from the plurality of frames of the transparency original.

Furthermore, in the image reading apparatus according to claim 3, the image reading apparatus of the present invention further comprises: a carrier-frame moving means moving the carrier frame, and when a frame is designated by the frame designation command, the read controlling means drives the carrier moving means to move the frame-designated frame of the transparency original to a reading position for reading by the image reading means, and drives the carrier-frame moving means to cause the image reading means to read the image data of the frame-designated frame.

In accordance with this image reading apparatus, when there has been an image batch read command, the read controlling means causes the image reading means to read the image data of the plurality of frames of the transparency original by driving the carrier moving means, and when there has been a frame designation command, the read controlling means causes the image reading means to read the image data of the frame-designated frame by driving the carrier-frame moving means. In other words, in this image reading apparatus, when a frame is designated, the carrier member is moved by moving the carrier frame, unlike the case of batch reading during which the carrier member itself is moved. When a frame-designated image is read, it is generally necessary to move the carrier frame accurately; however, in batch reading, it suffices if at least the frame subject to image reading can be specified, so that the moving accuracy of the carrier member can be low. For this reason, in this image reading apparatus, even if, for example, a slight gap or clearance is produced between the carrier frame and the carrier member as a result of widening the insertion port to facilitate the insertion of the carrier member, insofar as the carrier member is stationary on the carrier frame, the frame-designated image can be read with high accuracy as compared with a case where the carrier member is moved on the carrier frame in a shaky manner.

Furthermore, in accordance with the present invention, there is provided an image reading apparatus which comprises: a carrier member holding a film-shaped transparency original which has a plurality of frames; an illuminating means illuminating the transparency original; and an image reading means reading image data of the transparency original illuminated by the illuminating means, in which when the image data is read in previewing, the carrier member is moved by a carrier moving means, and when final image reading of the image data is effected, the carrier member is moved by moving a carrier frame having the carrier moving means. In accordance with this image reading apparatus, when preview reading is effected, the image data of the plurality of frames is read by causing the carrier moving means to move the carrier member, whereas when final reading is effected, the image data of a predetermined frame is read by moving the carrier member by moving the carrier frame. In other words, during final reading, the carrier member is moved by moving the carrier frame, unlike the case of preview reading during which the carrier member itself is moved. During final reading, it is generally necessary to move the carrier frame accurately, whereas, during preview reading, it suffices if at least the image in the frame can be read, so that the moving accuracy of the carrier member can be low. For this reason, in this image reading apparatus, even if, for example, a slight gap or clearance is produced between the carrier frame and the carrier member as a result of widening the insertion port to facilitate the insertion of the carrier member, insofar as the carrier member is stationary on the carrier frame, the image in the designated frame can be read with high accuracy during final reading as compared with a case where the carrier member is moved on the carrier frame in a shaky manner.

In addition to the standpoints described above, the standpoint of invention of the image reading apparatus in accordance with the present invention lies in what is evident from the description of the best mode for carrying out the invention or its drawings.

BRIEF DESCRIPTION OF THE DRAWINGS

FIG. 12($b$) is a right-hand side elevational view illustrating the embodiment of the carrier member in accordance with the present invention;

FIG. 12($c$) is a left-hand side elevational view illustrating the embodiment of the carrier member in accordance with the present invention;

FIG. 12($d$) is a cross-sectional view illustrating the embodiment of the carrier member in accordance with the present invention;

FIG. 12($e$) is a front elevational view illustrating the embodiment of the carrier member in accordance with the present invention.

BEST MODE FOR CARRYING OUT THE INVENTION

Figure 1:
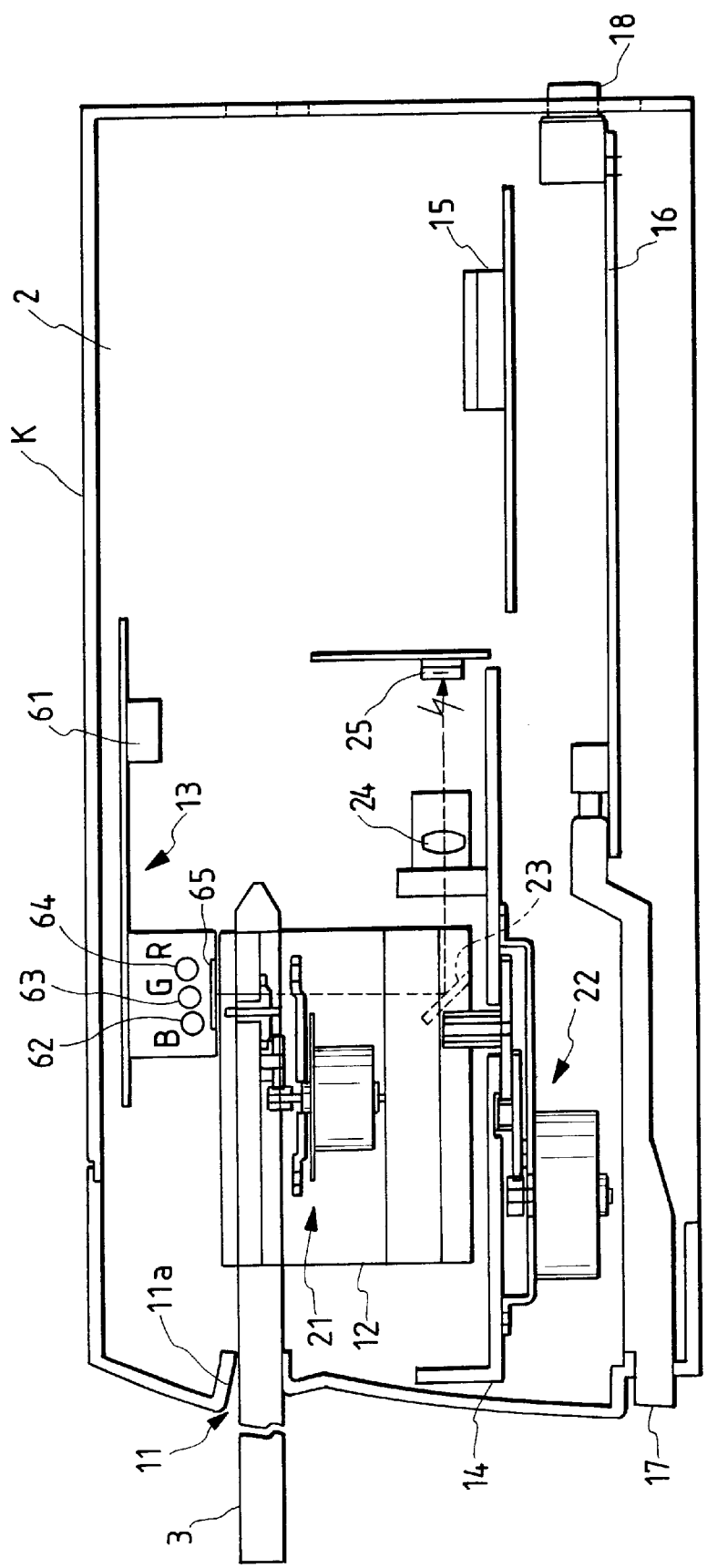
FIG. 1 is a right-hand side opened-up view illustrating an embodiment of an image reading apparatus in accordance with the present invention.

Next, referring to the drawings, a detailed description will be given of an embodiment of the present invention.

Figure 2:
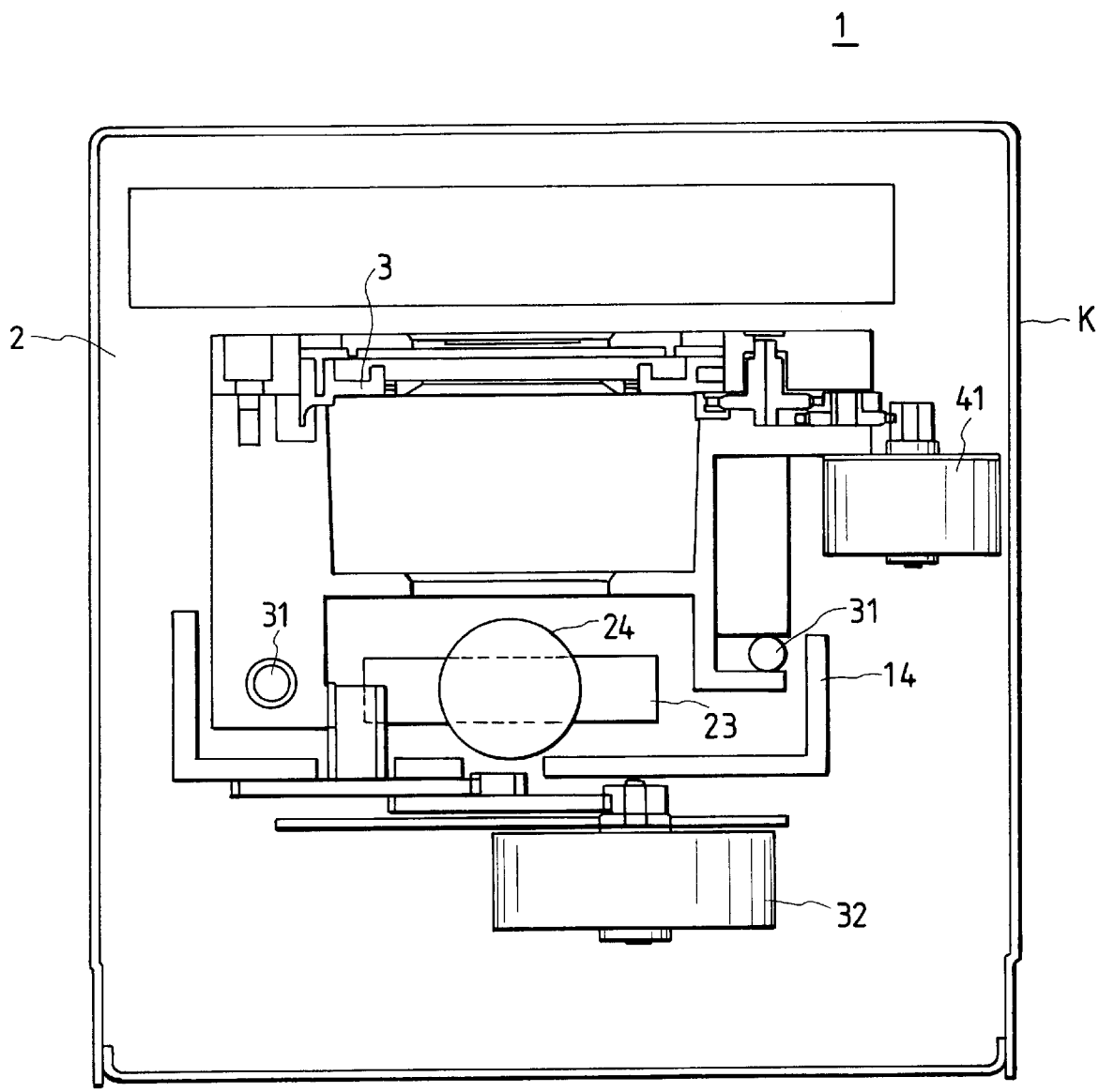
FIG. 2 is a front opened-up view illustrating the embodiment of the image reading apparatus in accordance with the present invention.
Figure 3:
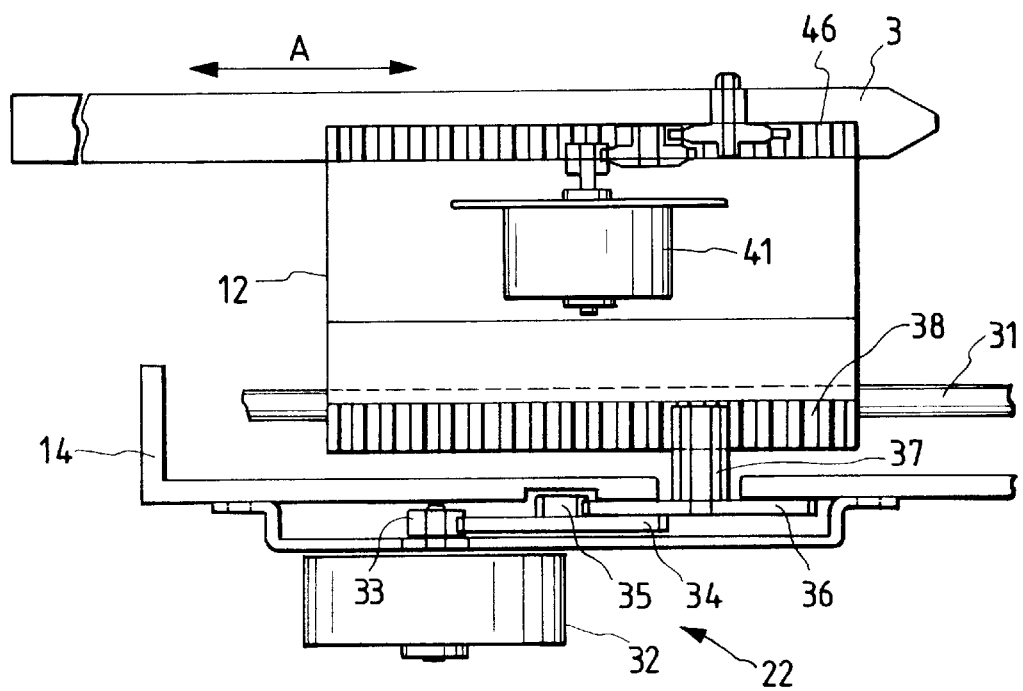
FIG. 3 is a right-hand side elevational view illustrating the embodiment of a carrier guide unit and a carrier-frame guide unit in the image reading apparatus in accordance with the present invention.
Figure 12:
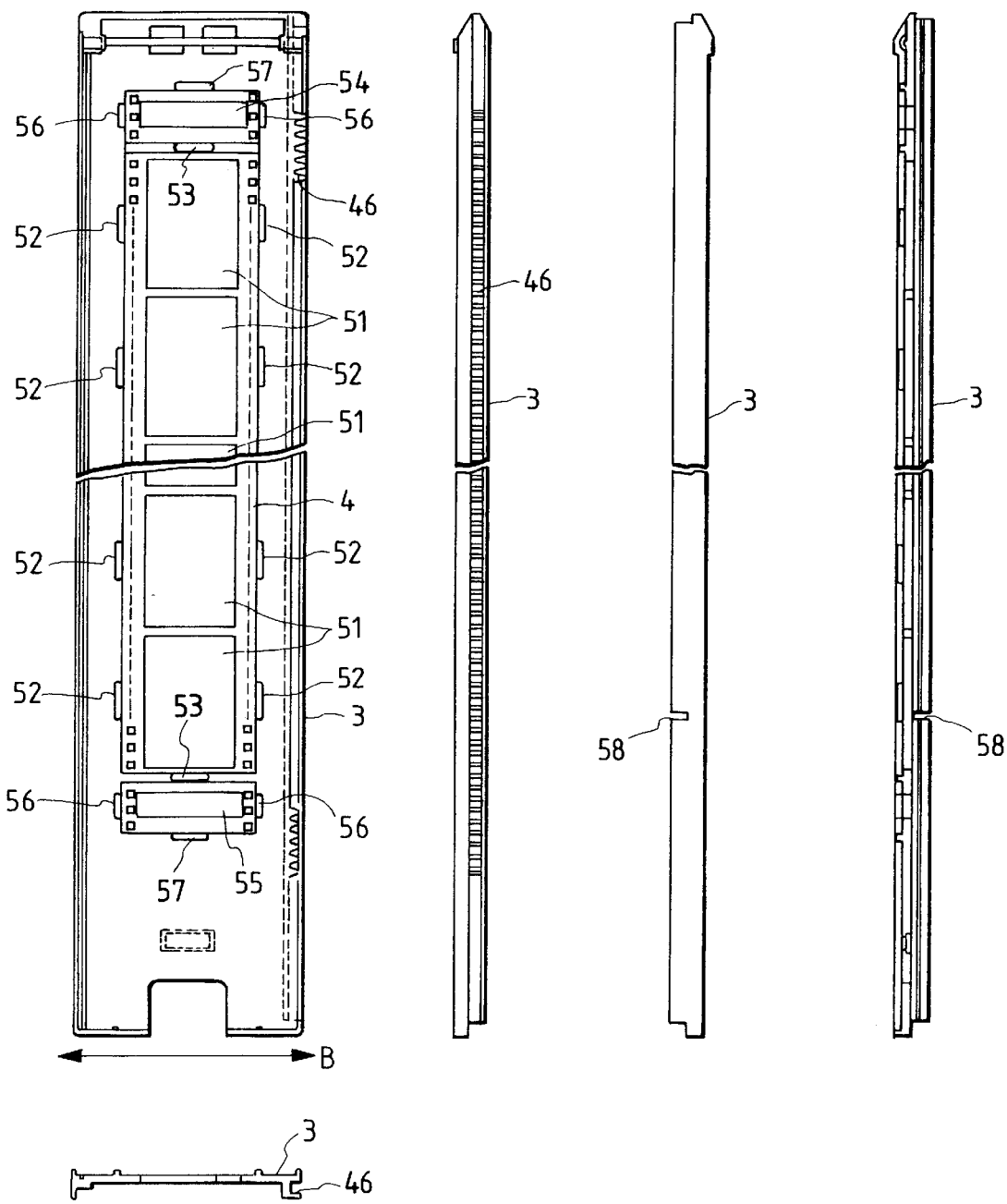
FIG. 12($a$) is a plan view illustrating the embodiment of the carrier member in accordance with the present invention.

FIGS. 1 and 2 are a right-hand side opened-up view and a front opened-up view, respectively, of an image reading apparatus 1 in accordance with the present invention. The image reading apparatus 1 is provided with an apparatus body 2 and a carrier member 3 which holds a film-shaped transparency original such as a photographic film and a microfilm. This image reading apparatus 1 is connected to an image display device (not shown) of a computer apparatus or the like via an interface line for data transfer (e.g., a SCSI line), and is so arranged as to permit so-called previewing in which, prior to high-accuracy reading of image data (hereafter referred to as the "final image reading"), image data of all of the transparency original 4 (see FIG. 12($a$)) being held in the carrier member 3 or a plurality of designated frames or one designated specific frame is automatically read, and a display is given on the image display device or the like on the basis of the image data. In this preview, the image display device is capable of storing the image data in correspondence with each frame in the carrier member 3, and is capable of displaying on the display one image of each frame at a time or a plurality of images simultaneously. As a result, the user is capable of specifying an image subject to reading on the display, and by designating the frame of the image, the user is capable of effecting the final image reading.

Hereafter, a detailed description will now be given of each component element.

As respectively shown in FIGS. 1 and 2, the apparatus body 2 comprises a carrier insertion port 11 provided in its body casing K so as to insert the carrier member 3; a carrier frame 12 holding the carrier member 3 inserted through the carrier insertion port 11 and guiding the carrier member 3 into the interior of the body casing K; an illuminating unit (projecting unit) 13 illuminating light to the transparency original 4 which is held by the carrier member 3; a base 14 moving the carrier frame 12; a power supply unit 15 supplying electric power to the respective units; a printed circuit board 16 on which a digital processing circuit for effecting various items of digital processing is mounted; a power supply switch 17; and a connector 18 for connection to an interface line for data transfer. Further, disposed on the carrier frame 12 is a carrier guide unit (carrier moving means) 21 moving the carrier member 3 and guiding the same to an image reading position so as to allow a CCD (image reading means) 25 to read image data at the time of previewing. Disposed on the base 14 are a carrier-frame guide unit (carrier-frame moving means) 22 moving the carrier frame 12 and guiding the carrier member 3 to the image reading position so as to allow the CCD 25 to read the image data during the final image reading; a reflecting plate 23 allowing the light emitted from the illuminating unit 13 and transmitted through the transparency original 4 to be reflected substantially at an angle of 90°; a focusing lens 24 focusing the light reflected by the reflecting plate 23; and the CCD 25 effecting photoelectric conversion of the light focused by the focusing lens 24.

The carrier insertion port 11 is formed in such a way that its upper side wall 11$a$ is inclined, and the arrangement provided is such that as the carrier member 3 is inserted along the side wall 11$a$, the carrier member 3 can be easily guided to the carrier frame 12.

Figure 4:
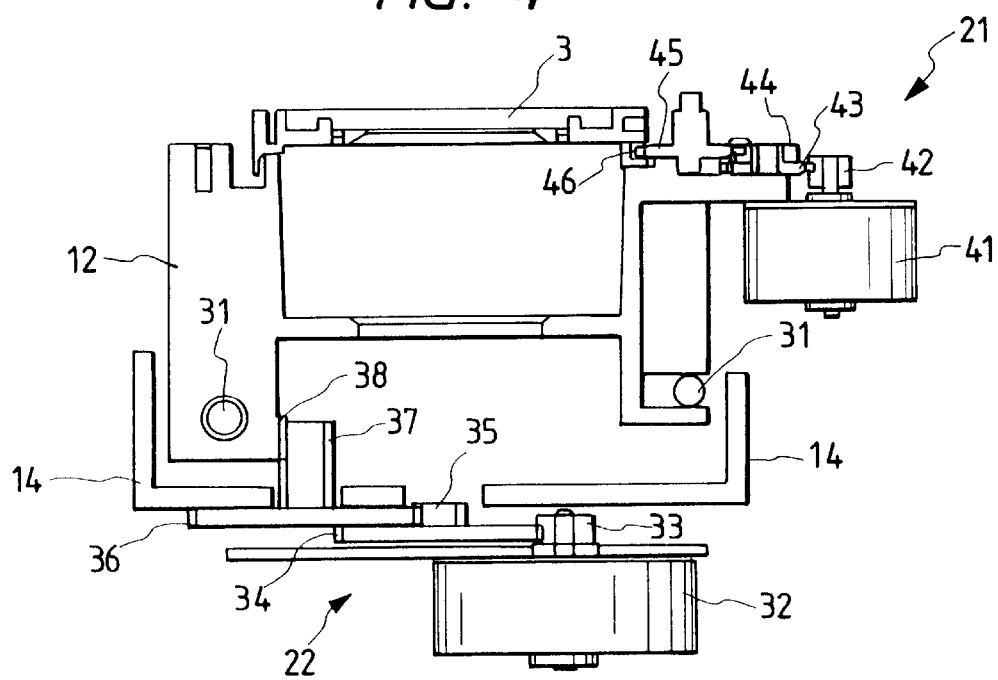
FIG. 4 is a front elevational view illustrating the embodiment of the carrier guide unit and the carrier-frame guide unit in the image reading apparatus in accordance with the present invention.
Figure 5:
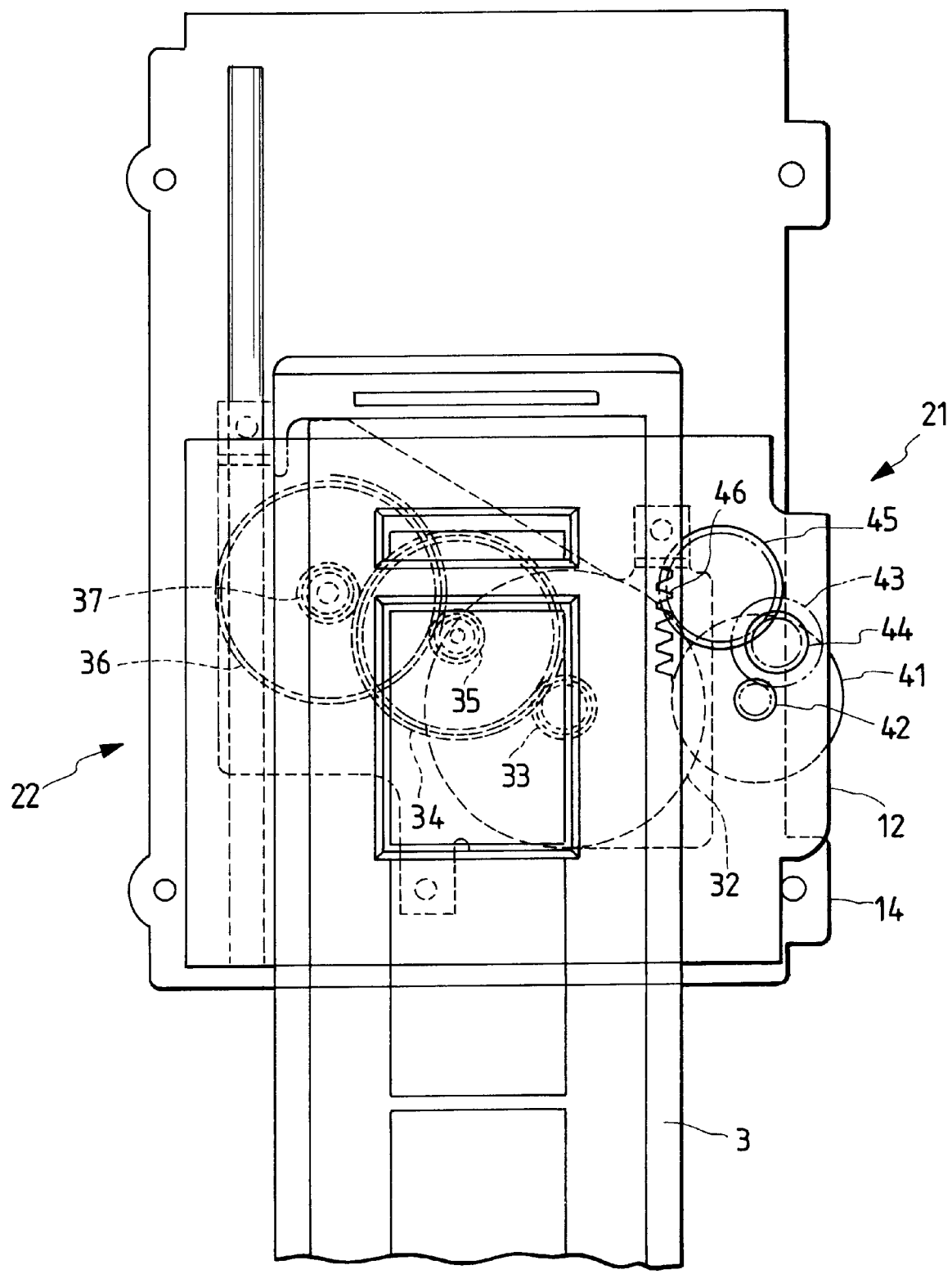
FIG. 5 is a plan view illustrating the embodiment of the carrier guide unit and the carrier-frame guide unit in the image reading apparatus in accordance with the present invention.
Figure 6:
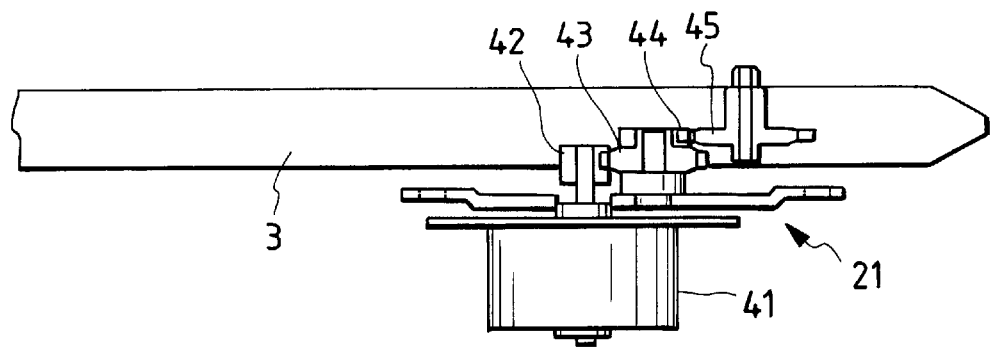
FIG. 6 is a right-hand side elevational view illustrating the embodiment of the carrier guide unit in the image reading apparatus in accordance with the present invention.
Figure 7:
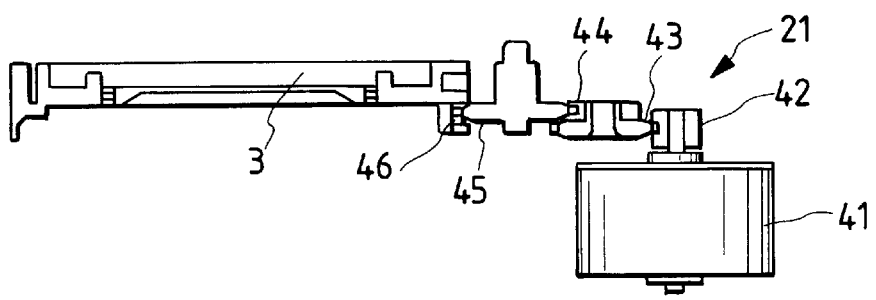
FIG. 7 is a front elevational view illustrating the embodiment of the carrier guide unit in the image reading apparatus in accordance with the present invention.

The base 14 is fixed to the body casing K. As shown in FIGS. 2 to 5, 9, and 10, the arrangement provided is such that the carrier frame 12 can be moved along a pair of shafts 31 fixed inside the body casing K in parallel with a moving direction A (see FIG. 3) of the carrier member 3. Specifically, as respectively shown in FIGS. 3, 4, 9, and 10, disposed below the base 14 are a first motor 32 which is a stepping motor moving the carrier frame 12; a second gear 34 meshing with a first gear 33 which is axially secured to a motor shaft of the first motor 32; and a third gear 36 which meshes with a small-diameter gear 35 provided coaxially on the second gear 34 and which has a small-diameter gear 37 provided coaxially therewith. Meanwhile, as shown in FIG. 4, a rack 38 meshing with the small-diameter gear 37 is formed on a lower portion of an inner side surface of a left-hand body of the carrier frame 12. As a result, when the first motor 32 is driven, power is transmitted to the carrier frame 12 via the first gear 33, the second gear 34, the small-diameter gear 35, the third gear 36, the small-diameter gear 37, and the rack 38, so that the carrier frame 12 moves along the pair of shafts 31. In this case, by the one-step rotation of the first motor 32, the carrier member 3 can be moved together with the carrier frame 12 with a very high accuracy of, e.g., about 11 μm, with the result that it becomes possible to increase the accuracy of reading the image data. In addition, the carrier-frame guide unit 22 is so arranged as to be capable of moving the carrier frame by a one-fourth (although not particularly limited) frame portion of the transparency original 4 fitted in the carrier member 3. Consequently, effective use is made of the internal space of the apparatus body 2. Incidentally, the first motor 32 and the various gears 33 to 37 form the aforementioned carrier-frame guide unit 22.

Figure 8:
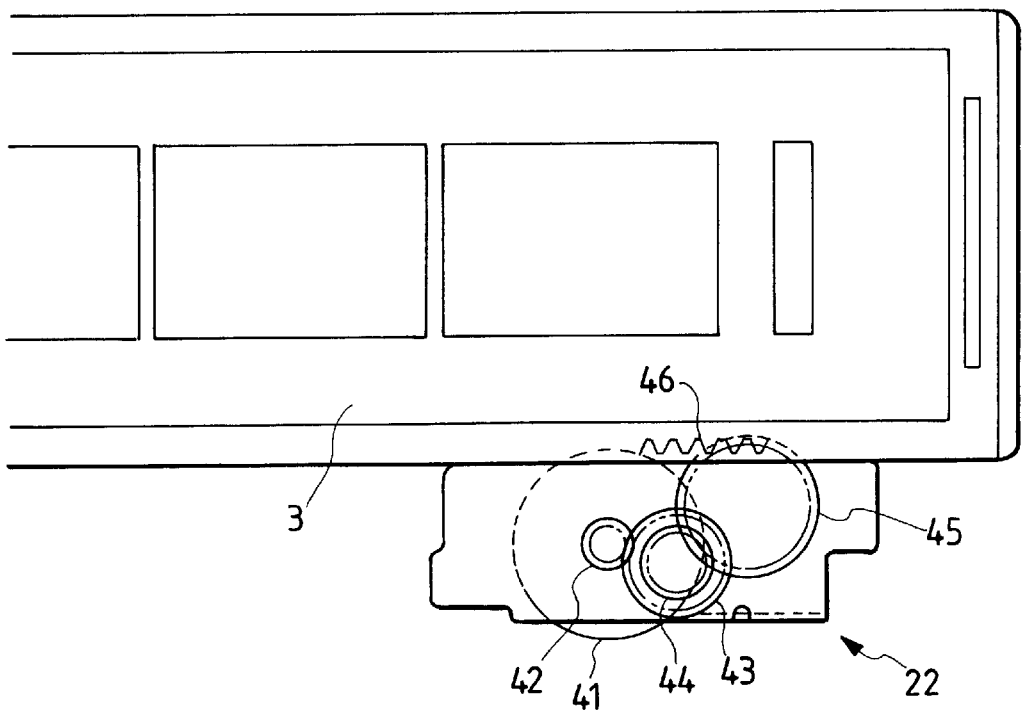
FIG. 8 is a plan view illustrating the embodiment of the carrier guide unit in the image reading apparatus in accordance with the present invention.
Figure 9:
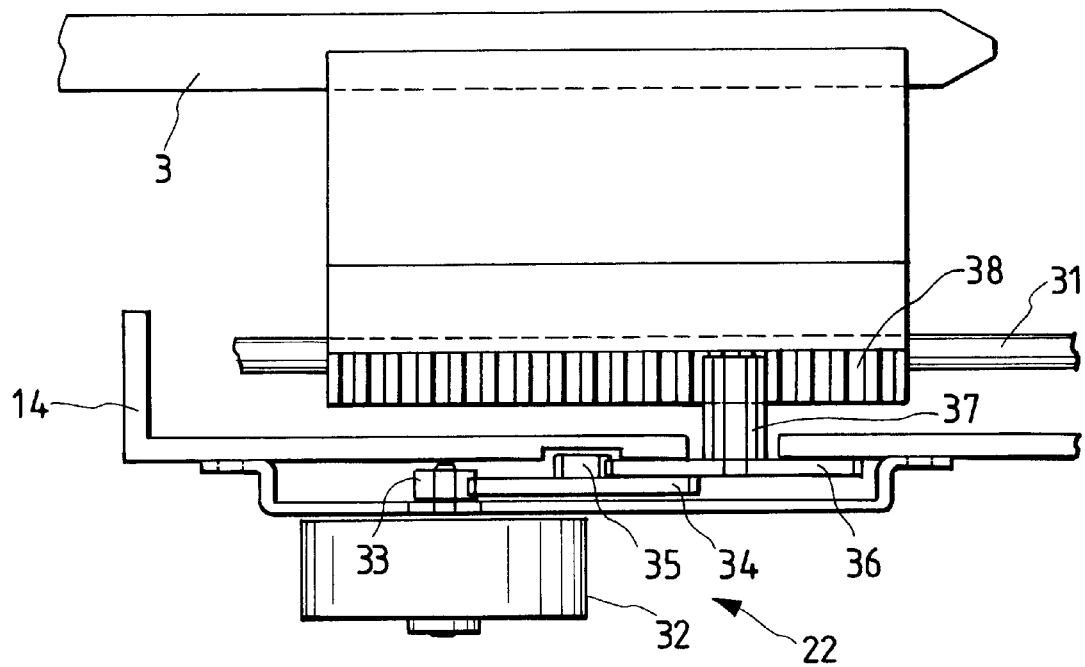
FIG. 9 is a right-hand side elevational view illustrating the embodiment of the carrier-frame guide unit in the image reading apparatus in accordance with the present invention.
Figure 10:
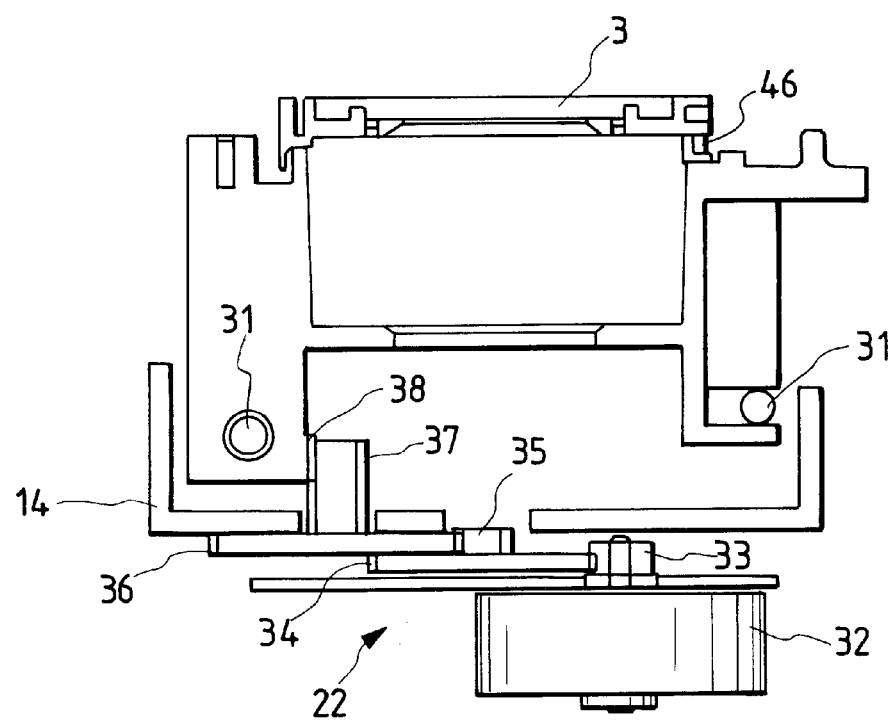
FIG. 10 is a front elevational view illustrating the embodiment of the carrier-frame guide unit in the image reading apparatus in accordance with the present invention.
Figure 11:
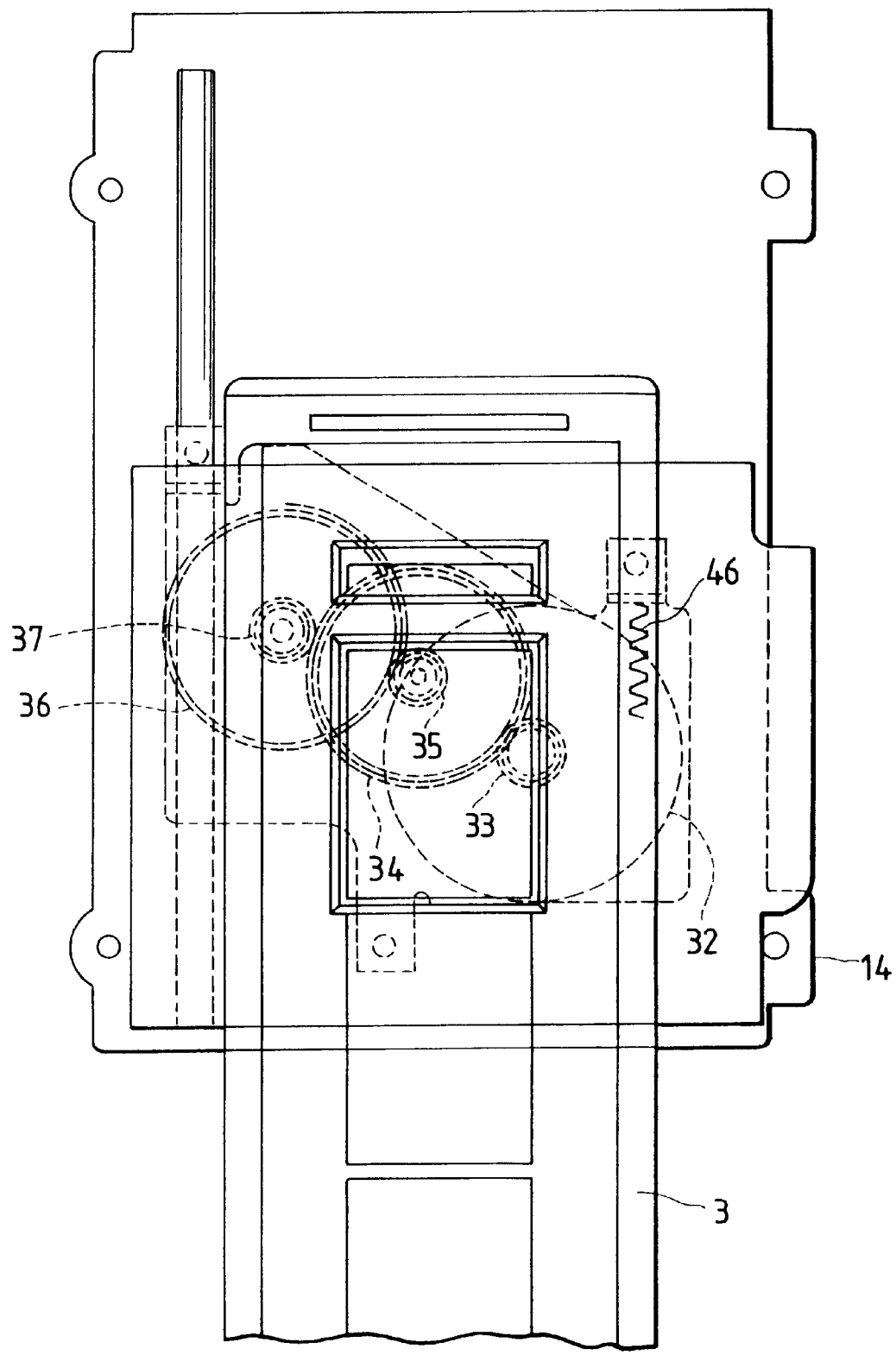
FIG. 11 is a plan view illustrating the embodiment of the carrier-frame guide unit in the image reading apparatus in accordance with the present invention.

The carrier frame 12 is so arranged as to be capable of guiding the carrier member 3, from its front end to its rear end, inside the body casing K. As shown respectively in FIGS. 4 to 7, the carrier frame 12 comprises a second motor 41 which is a stepping motor moving the carrier member 3, a fifth gear 43 meshing with a fourth gear 42 which is axially secured to a motor shaft of the second motor 41, and a sixth gear 45 meshing with a small-diameter gear 44 which is provided coaxially on the fifth gear 43. Meanwhile, a rack 46 meshing with the sixth gear 45 is formed on a thicknesswise substantially central portion of a right-hand side surface of the carrier member 3 in FIG. 4 (see FIGS. 8 and 12). As a result, when the second motor 41 is driven, power is transmitted to the carrier member 3 via the fourth gear 42, the fifth gear 43, the small-diameter gear 44, the sixth gear 45, and the rack 46. Consequently, the carrier member 3 moves inside the body casing K in a state of being held on the carrier frame 12. In this case, the distance by which the carrier frame 12 moves by the one-step rotation of the second motor 41 is set to be greater than the distance by which the carrier member 3 moves by the one-step rotation of the first motor 32. Consequently, during previewing, the speed at which image data is read is fast due to the fast movement of the carrier member 3, with the result that the specification of an object of reading during previewing can be effected quickly. Incidentally, the second motor 41 and the various gears 42 to 45 form the aforementioned carrier guide unit 21.

As respectively shown in FIGS. 12(a) to 12(e), the carrier member 3 is formed to be thin and elongated. The carrier member 3 comprises six (although particularly not limited) original windows 51; projections 52 with rectangular cross sections each formed on either side of each original window 51 and projecting in the upward direction of a fitting surface (toward this side in the plane of the drawing in FIG. 12(a)); and a pair of projections 53 with rectangular cross sections formed on respective longitudinally opposite end sides of the two original windows 51 located at longitudinally opposite ends (upper and lower ends in the same drawing) of the carrier member 3, and projecting in the upward direction of the fitting surface.

With this carrier member 3, by fitting the transparency original 4 between the projections 52 and between the projections 53, the transparency original 4 can be secured in the carrier member 3 in a state of being nipped by the projections 52 and by the projections 53. Further, by fitting a transparent plastic plate (not shown) between the projections 52 and between the projections 53, the transparency original 4 can be nipped from its obverse and reverse sides by the base surface of the carrier member 3 and the plastic plate, thereby preventing the deflection of the transparency original 4. In this case, the arrangement provided is such that since a photographic film or the like is generally divided for each six frames during a printing service, in this carrier member 3, each frame of the transparency original 4 is located immediately above each original window 51 when the six-frame portion of the transparency original 4 is fitted in. As a result, when light is radiated from the illuminating unit 13, its transmitted light reaches the reflecting plate 23 via the transparency original 4 and the original window 51.

Further, hole portions 54 and 55 are respectively formed in a front end portion (the upper side in the same drawing) and a rear end portion as viewed in the longitudinal direction of the carrier member 3. A pair of projections 56, as well as a pair of projections 57 each having the same shape as that of the aforementioned projection 53, are formed at each transversely opposite end side of each of the hole portions 54 and 55 and at each longitudinally opposite end side of the carrier member 3, respectively. In this case, by fitting a brown base film, which is an unrecorded portion of the negative film, between the pair of projections 56 and between the two projections 53 and 57, the brown base film can be secured in the carrier member 3 in a state of being nipped by the projections 56 and by the projections 53 and 57. Further, by fitting the transparent plastic plate between the projections 56 and between the projections 53 and 57, the brown base film can be nipped from its obverse and reverse sides by the base surface of the carrier member 3 and the plastic plate. As a result of the fact that the brown base film covers the hole portion 57, the density of light transmitted through the brown base film is detected by the CCD 25, and the shading correction of the image and white reference adjustment can be adjusted on the basis of that density. In this case, since the transparency original 4 and the brown base film are nipped from their obverse and reverse sides by the plastic plate and the base surface, the deflection of the transparency original 4 and the brown base film can be effectively prevented, and the reading conditions for image data can be set to be identical, with the result that correction data at that time of adjustment of the shading correction of the image and white reference adjustment can be generated accurately. In addition, since the plastic plate and the base surface which forms edges of the window 54 (or 55) nip the brown base film along the main scanning direction (the direction of the line of arrangement of the CCD 25, i.e., the direction indicated by arrow B in FIG. 12(a)) of image ready by the CCD 25 in the apparatus body 2, the occurrence of deflection in the main scanning direction is prevented more effectively, so that the correction data can be generated very accurately. Further, since the hole portions 54 and 55 are formed in the longitudinally opposite end portions of the carrier member 3, in whichever direction the carrier member 3 moves in the direction A, the shading correction of the image and the white reference adjustment are made possible. Incidentally, the hole portions 54 and 55 may be made to function as reference holes for determining the image reading position.

Furthermore, as shown in FIG. 12(c), a notch 58 for positioning the transparency original 4 located at the hole portion 55 to the image reading position is formed in a side surface (thickness surface) of the carrier member 3 in the vicinity of an intermediate portion of the original window 51 close to the hole portion 55. Meanwhile, an interrupter (not shown) is disposed in the body casing, and if the interrupter detects the passage of the front end portion of the carrier member 3 and the slit 58, a main CPU 71 (see FIG. 13)

outputs a drive signal for motor driving to the second motor 41 on the basis of the passage detection signal, thereby making it possible to effect the positioning of the transparency original 4.

As shown in FIG. 1, the aforementioned illuminating unit 13 is provided with an inverter circuit 61, xenon lamps 62, 63, and 64 which are light sources at the time of image reading, and a diffusion plate 65 diffusing the light from the xenon lamps 62, 63, and 64. The xenon lamps 62, 63, and 64 are respectively controlled so as to be lit in a fixed order by a lamp control unit 81 (see FIG. 13), and emit light having wavelengths of blue, green and red colors. As a result, the three colors of light which have been transmitted through the transparency original 4 are respectively photoelectrically converted by the CCD 25, and image data of a color image is stored for each of the three colors in a buffer RAM 82 (see FIG. 13) inside an image control unit which will be described later. It should be noted that the light sources are not limited to the xenon lamps, and, among others, three LEDs capable of respectively emitting the aforementioned three colors, or a fluorescent lamp capable of emitting light including the three colors of light, may be used, for example.

Figure 13:
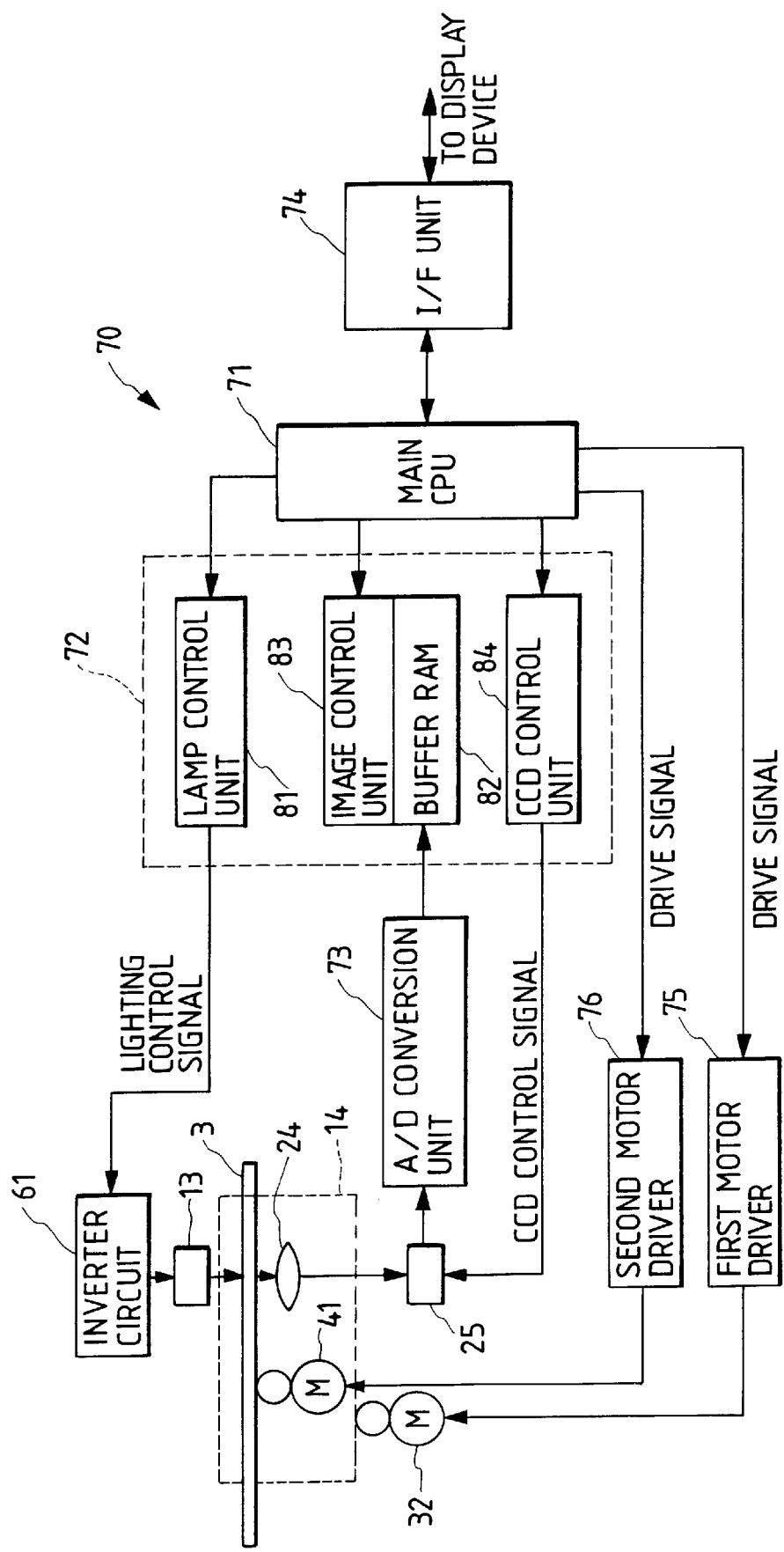
FIG. 13 is a block circuit of a main circuit illustrating the embodiment of the image reading apparatus in accordance with the present invention.

Referring next to FIG. 13, a description will be given of a control system of the image reading apparatus 1.

The circuit block diagram shown in the drawing shows a main circuit including a control circuit 70 of the image reading apparatus 1, each electrical circuit part is mounted on the aforementioned printed circuit board 16. The control circuit comprises the main CPU (read controlling means) constituting the nucleus of various items of processing; an image processing gate array 72 executing image processing under control by the main CPU 71; an A/D conversion unit 73 effecting the A/D conversion of an image signal outputted from the CCD 25; an interface unit 74 converting the image data and various signals to data of a predetermined communication format and receiving and transmitting the converted data between the main CPU 71 and the image display device of a host computer; and a first motor driver 75 and a second motor driver 76 respectively driving the first and second motors 32 and 41 on the basis of the drive signal from the main CPU 71. Here, the main CPU 71, the image processing gate array 72, and the CCD 25 form the image reading means in the present invention. In addition, the gate array 72 is provided with the lamp control unit 81 controlling the lighting of the xenon lamps 62 to 64 by outputting lighting control signals via the inverter circuit 61; the buffer RAM 82 storing the image data; an image control unit 83 fetching the image data outputted from the A/D conversion unit 73 and causing the buffer RAM 82 to store the same in correspondence with the respective pixels, and executing the shading correction of the image, white/black reference adjustment, and the like; and a CCD control unit 84 controlling the photoelectric conversion of the CCD 25 by outputting a CCD control signal in response to a storage interval signal, a sift signal, and a clock signal outputted from the main CPU 71.

Next, a description will be given of image read processing in the image reading apparatus 1.

First, when the carrier member 3 is inserted in the carrier insertion port 11, as its front end portion passes the interrupter, the interrupter outputs a passage detection signal to the main CPU 71. The main CPU 71 outputs a drive signal to drive the second motor 41, thereby guides the carrier member 3 to a predetermined standby position inside the body casing K. In this state, when a preview signal (a batch read command, an image read command) is outputted from the image display device via the interface unit 74, the main CPU 71 outputs a drive signal to the second motor driver 76 to drive the second motor 41, and moves the carrier member 3 until a signal representing the detection of passage of the front end portion is outputted. Next, the main CPU 71 causes the image data from the CCD 25 to be read by the image control unit 83 by outputting a CCD control signal without lighting the xenon lamps 62 to 64. Then, the main CPU 71 causes the image control unit 83 to set the image data at this time to the luminance level of a 0 gradation, thereby effecting black level adjustment. In this case, the luminance level of the image data is set to 256 gradations for each color, and the 0 gradation corresponds to the black level and the 255 gradation to the white level.

Next, the main CPU 71 causes the xenon lamps 2 to 64 to be consecutively lit up one by one, and causes the image control unit 83 to consecutively read the image data of R, G, and B from the CCD 25. The main CPU 71 effects white level adjustment by adjusting the driving speed of the second motor 41 and adjusting the light-up time durations of the xenon lamps 62 to 64, respectively, in accordance with a $_g$-table stored in a built-in ROM, such that a maximum value of the image data which is read at this time becomes a gradation of 130 to 150 or thereabouts. At the same time, the main CPU 71 causes the image control unit 83 to execute shading correction. Namely, correction data is generated so that the image data in one row of the CCD 25 is uniformly set to 265 gradations, on the basis of the light quantities of the xenon lamps 62 to 64, the reflection coefficient of the reflecting late 23, aberrations of the focusing lens 24, and the like. In this case, the correction data is automatically generated such that when the brown base film of the negative film is fitted in the hole portion 54, the luminance of the light transmitted through the brown base film is set as the white level, and when the brown base film is not fitted, the luminance of the light which has directly passed the hole portion 54 is set to the white level. Through such processing, the dynamic range of the luminance level of the image data can be automatically can be made largest. It should be noted that although, in the above-described series of operations, the black level adjustment, white level adjustment, and shading correction are effected by means of the hole portion 54 by detecting the front end portion, these adjustments and the like may be effected by the hole portion 55.

Next, the main CPU 71 outputs a drive signal to move the carrier member 3 so as to allow an end of a leading (first) original window 51 to be located at the beginning of the reading position, and the reading of the image is then started. When reading the image, various parameters are outputted from the main CPU 71 to the lamp control unit 81, whereupon the lamp control unit 81 outputs a lighting control signal to the inverter circuit 61, thereby allowing the xenon lamps 62 to 64 to be consecutively lit up one by one. While outputting the drive signal and the CCD control signal, the main CPU 71 causes the image control unit 83 to consecutively read the image data of R, G, and B of the image.

The image data which has been read is subjected to shading correction, color correction, and enlargement/reduction processing by the image control unit 83, and is then temporarily stored in the buffer RAM 82. Then, the main CPU 71 reads the image data stored in the buffer RAM 82, and outputs the same to the interface unit 74. At the same time, the interface unit 74 converts the image data to data of a predetermined communication format, and outputs the converted data to the image display device.

After the image on the transparency original 4 corresponding to the first original window has been read, the main CPU 17 continuously outputs the drive signal to rotate the second motor 41 by a predetermined number of steps, thereby moving the carrier member 3 such that the end of the second original window 51 is located at the beginning of the reading position. Then, the main CPU 71 outputs various parameters to the lamp control unit 81 and the image control unit 83, respectively, thereby allowing the image control unit 83 to read the image data of the transparency original 4. By repeating these processings, the main CPU 71 consecutively causes the image data of the transparency original 4 at the third to sixth original windows to be read, and outputs the image data to the interface unit 74 on each such occasion. It should be noted that, in this preview processing, in the CCD 25, outputs of a plurality of adjacent CCD elements are combined into one and are set as one piece of image data, with the result that reading is effect at a resolution of 50 to 300 dpi or thereabouts which is lower than the resolution at the time of the final image reading. As a result, it is possible to shorten the reading time in previewing. In addition, since the image reading accuracy can be slightly low, the slight clearance between the carrier frame 12 and the carrier member 3 can be allowed. Hence, by, for example, enlarging the opening area of the carrier insertion port 11 or by making the meshing between the rack 46 and the sixth gear 45 slightly loose, it is possible to facilitate the insertion of the carrier member 3 into the body casing K.

The image display device stores the inputted image data in an image data RAM (not shown), and when a predetermined keying operation is performed, the image on the transparency original 4 at the designated original window 51 is displayed on a display unit.

On the other hand, if a user designates a frame by a keying operation after confirming the image on the display unit, a frame designation signal (frame designation command) is outputted from the image display device to the main CPU 71 via the interface unit 74. The main CPU 71 outputs a drive signal to the second motor driver 76 to drive the second motor 41 by a predetermined number of steps, thereby guiding the carrier member 3 so that the original window 51 of the designated frame is located at the beginning of the reading position. Next, the main CPU 17 starts the final image reading, and outputs a drive signal to the first motor driver 75, thereby driving the first motor 32 by a predetermined number of steps such that the carrier frame 12 is moved by a one-frame portion of the original window 51. At the same time, the main CPU 71 outputs the lighting control signal and the CCD control signal, thereby executing the aforementioned shading processing and reading the image data. In this case, since the moving distance of the carrier frame 12 due to the rotation of the first motor 32 by one step is very small, the image can be read with high accuracy. The image data which has been read is displayed to the image display device via the interface unit 74 by the main CPU 71 in the same way as described above. Subsequently, the image display device effects such as display processing of the image on the basis of the image data, image processing/correction processing such as luminance adjustment of the image data, fit processing in which an image on an arbitrary frame is fitted in an image on another frame, and the processing of writing in a storage medium such as MO (magneto-optical disk), DAT, MD, and a floppy disk.

Although, in the above-described embodiment, a description has been given of an example in which image reading is effected on the basis of the light transmitted through the transparency original 4, the present invention is not limited to the same, and it goes without saying that the present invention is also applicable to a case where image reading is effected on the basis of reflected light.

In addition, although, in this embodiment, the carrier moving means and the carrier-frame moving means are formed by the motors 32 and 41 and various gears, the present invention is not limited to the same, and these means may be arranged by a combination of a motor, a link mechanism, and a belt mechanism.

Further, although, in this embodiment, a description has been given of an example in which an image based on the transparency original 4 is displayed on an external image display device, a display unit such as a liquid-crystal panel or a cathode-ray tube may be provided in the image reading apparatus 1, and an image may be displayed on the display unit serving as the image display device. In addition, as for the batch read command, the image read command, and the frame designation command as well, an arrangement may be provided such that the apparatus body 2 is provided with an operation switch, and these commands are outputted by the operation of the operation switch.

INDUSTRIAL APPLICABILITY

In accordance with the image reading apparatus of the present invention, as the read controlling means causes the image reading means to continuously read a transparency original having a plurality of frames, the user is capable of easily specifying a frame of the transparency original for which image reading is desired among the plurality of frames of the transparency original held in the carrier member, by causing the image display device to display the image on the transparency original which has been read and by making confirmation on the displayed image. For this reason, it is possible to eliminate the troublesome operation in which each of the frames must be moved to automatically read the plurality of frames continuously.

In addition, in accordance with the image reading apparatus of the present invention, as the read controlling means causes the image reading means to continuously read a plurality of designated frames or one specific frame of the transparency original, the user is capable of easily specifying a frame of the transparency original for which image reading is desired among the plurality of frames of the transparency original held in the carrier member, by causing the image display device to display the image on the transparency original which has been read and by making confirmation on the displayed image. For this reason, it is possible to eliminate the troublesome operation in which each of the frames must be moved to automatically read the plurality of frames continuously.

Further, in accordance with the image reading apparatus of the present invention, by, for example, effecting frame designation by the operation switch, the user is capable of causing the image reading means to read image data of an arbitrary frame from the transparency original having the plurality of frames.

Furthermore, in accordance with the image reading apparatus of the present invention, since the carrier member together with the carrier frame is moved by the carrier-frame moving means, by enlarging the insertion port, the insertion of the carrier member into the image reading apparatus can be facilitated, and a frame-designated image can be read with high accuracy.

What is claimed is:

1. An image reading apparatus comprising:
   a carrier member for holding a film-shaped transparency original which has a plurality of frames;
   an illuminating means for illuminating the transparency original;

an image reading means for reading image data of the transparency original illuminated by said illuminating means; and a carrier frame having a carrier moving means for moving said carrier member to allow said image reading means to read the image data, the image reading apparatus further comprising:

a read controlling means for providing control such that the image data of each frame of the transparency original is continuously read by said image reading means by driving said carrier moving means in accordance with an image batch read command, wherein the image data which has been read is stored in buffer memory, converted into a predetermined communication format, and outputted from buffer memory to an image display device connected to said image reading apparatus.

2. An image reading apparatus according to claim 1, wherein said read controlling means drives said carrier moving means so as to cause the image data of a frame subjected to frame designation in accordance with a frame designation command for designating one of the plurality of frames.

3. An image reading apparatus according to claim 2, further comprising: a carrier-frame moving means moving said carrier frame, wherein when a frame is designated by the frame designation command, said read controlling means drives said carrier moving means to move the frame-designated frame of the transparency original to a reading position for reading by said image reading means, and drives said carrier-frame moving means to cause said image reading means to read the image data of the frame-designated frame.

4. An image reading apparatus comprising:
a carrier member for holding a film-shaped transparency original which has a plurality of frames;
an illuminating means for illuminating the transparency original;
an image reading means for reading image data of the transparency original illuminated by said illuminating means; and
a carrier frame having a carrier moving means for moving said carrier member to allow said image reading means to read the image data;
a carrier-frame moving means moving said carrier frame, the image reading apparatus further comprising:
a read controlling means for providing control such that the image data of a designated frame of the transparency original is read by said image reading means by driving said carrier-frame moving means in accordance with an image read command, wherein the image data which has been read is outputted to an image display device connected to said image reading apparatus.

5. An image reading apparatus according to claim 4, wherein said read controlling means drives said carrier moving means so as to cause the image data of a frame subjected to frame designation in accordance with a frame designation command for designating one of the plurality of frames.

6. An image reading apparatus according to claim 5, further comprising:
a carrier-frame moving means moving said carrier frame, wherein when a frame is designated by the frame designation command, said read controlling means drives said carrier moving means to move the frame-designated frame of the transparency original to a reading position for reading by said image reading means, and drives said carrier-frame moving means to cause said image reading means to read the image data of the frame-designated frame.

7. An image reading apparatus comprising:
a carrier member for holding a film-shaped transparency original which has a plurality of frames;
an illuminating means for illuminating the transparency original; and
an image reading means for reading image data of the transparency original illuminated by said illuminating means,
wherein when the image data is read during a previewing operation, said carrier member is moved by a carrier moving means, and wherein
when final image reading of the image data is effected, said carrier member is moved by moving a carrier frame having said carrier moving means.

8. An image reading apparatus for selectively performing previewing and final image reading, comprising:
a carrier member for holding a transparency original having a plurality of frames for containing image data;
a carrier frame adapted to hold the carrier member, having a carrier guide unit for guiding the carrier member through the image reading apparatus;
a carrier frame guide unit for moving the carrier frame and carrier member;
an illuminating unit for illuminating the transparency original;
a CCD for reading image data by photoelectric conversion of detected light from the illuminating unit that is transmitted through the transparency original; and
a control unit having a CPU and a memory buffer for operating control signals for previewing and final image reading operations; wherein
during a previewing operation, control signals operate the carrier guide unit such that the image data of each frame of the transparency original is continuously read by the CCD, stored in the memory buffer, converted into a predetermined communication format in the CPU, and outputted from buffer memory to an image display device connected to the image reading apparatus, and
during a final image reading operation, control signals operate the carrier frame guide unit for reading image data in a designated frame of the transparency original with higher resolution as compared to a previewing operation.

9. The image reading apparatus according to claim 8, wherein the predetermined communication format includes shading correction.

10. The image reading apparatus according to claim 8, wherein the predetermined communication format includes color correction.

11. The image reading apparatus according to claim 8, wherein the predetermined communication format includes enlargement/reduction processing.

12. An image reading apparatus, comprising:
a carrier member for holding a film-shaped transparency original which has a plurality of frames;
a carrier frame for holding the carrier member;
a carrier moving means for moving the carrier member relative to the carrier frame;
a carrier frame moving means for moving the carrier frame and the carrier member;

an illuminating means for illuminating the film-shaped transparency original;

an image reading means for generating image data by reading at least one image of the frames on the film-shaped transparency original illuminated by the illuminating means; and a read controlling means for providing control such that the at least one image is read by driving the carrier moving means or the carrier frame moving means, wherein the image data is outputted to an image display device connected to the image reading apparatus.

13. The image reading apparatus according to claim 12, wherein the read controlling means provides control such that the image reading means continuously reads each image of each frame on the film-shaped transparency original by driving the carrier moving means, in accordance with an image batch read command.

14. The image reading apparatus according to claim 12, wherein the read controlling means provides control such that the image reading means reads an image of a designated frame on the film-shaped transparency original by driving the carrier frame moving means, in accordance with a frame designation command for designating one of the frames on the film-shaped transparency original.

15. The image reading apparatus according to claim 13, wherein the read controlling means provides control such that the image reading means reads an image of a designated frame on the film-shaped transparency original by driving the carrier frame moving means, in accordance with a frame designation command for designating one of the frames on the film-shaped transparency original.

16. The image reading apparatus according to claim 15, wherein the read controlling means provides control such that the carrier moving means moves the designated frame to a reading position at which the image reading means is capable of reading, and the carrier frame moving means moves the carrier member and the carrier frame so as to read the designated frame.

* * * * *